US009223883B2

(12) United States Patent
Sun

(10) Patent No.: US 9,223,883 B2
(45) Date of Patent: Dec. 29, 2015

(54) CONTEXT DRIVEN ARRANGEMENT OF PORTLETS IN A PORTAL

(75) Inventor: Lin Sun, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 1647 days.

(21) Appl. No.: 12/428,258

(22) Filed: Apr. 22, 2009

(65) Prior Publication Data

US 2010/0275116 A1    Oct. 28, 2010

(51) Int. Cl.
G06F 17/22    (2006.01)
G06F 17/30    (2006.01)
H04L 29/08    (2006.01)

(52) U.S. Cl.
CPC .... *G06F 17/30873* (2013.01); *G06F 17/30731* (2013.01); *H04L 67/28* (2013.01); *H04L 67/2838* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 7,400,316 B2 | 7/2008 | Appleyard et al. | |
| 7,475,354 B2 * | 1/2009 | Guido et al. | 715/742 |
| 7,840,707 B2 * | 11/2010 | Jerrard-Dunne | H04L 67/28 709/246 |
| 7,849,082 B2 * | 12/2010 | Westphal | 707/731 |
| 8,312,170 B2 * | 11/2012 | Ng | G06F 17/30873 709/246 |
| 8,943,432 B2 * | 1/2015 | Chakra | G06F 17/3089 709/205 |
| 2004/0030795 A1 | 2/2004 | Hesmer et al. | |
| 2005/0283524 A1 | 12/2005 | Kim | |
| 2006/0047777 A1 | 3/2006 | Harris et al. | |
| 2006/0053376 A1 | 3/2006 | Ng et al. | |
| 2006/0230059 A1 | 10/2006 | Etgen et al. | |
| 2008/0059419 A1 * | 3/2008 | Auerbach et al. | 707/3 |
| 2010/0146378 A1 * | 6/2010 | Bank | G06F 17/30905 715/234 |

OTHER PUBLICATIONS

Bernal et al. "Portals and Portlets: The Basics," IBM Websphere Portal Extenstions, May 2007, pp. 5-23.*

* cited by examiner

*Primary Examiner* — Maikhanh Nguyen
(74) *Attorney, Agent, or Firm* — Steven M. Greenberg, Esq.; CRGO Law

(57) ABSTRACT

Embodiments of the present invention provide a method, system and computer program product for context driven arrangement of portlets in a portal page. In an embodiment of the invention, a method of context driven arrangement of portlets in a portal page can be provided. The method can include computing a context for an application co-executing with a portal page in a computing client, and arranging portlets in the portal page in the computing client based upon the computed context.

20 Claims, 1 Drawing Sheet

CONTEXT DRIVEN ARRANGEMENT OF PORTLETS IN A PORTAL

BACKGROUND OF THE INVENTION

1. Field of the Invention

The present invention relates to the field of portal page distribution and more particularly to portlet arrangement in a portal page.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

The aggregation of content from several portlet applications within a single distributable page in a uniform manner can present unique challenges in crafting a navigable user interface. In this regard, though the portal user interface intends upon simplifying a view to multiple disparate types of information, cluttering the portal page with many different portlets can confuse the end user and defeat the intent of the portal page—too create simplicity in the presentation of different information in a single organized user interface.

BRIEF SUMMARY OF THE INVENTION

Embodiments of the present invention address deficiencies of the art in respect to portal arrangement in a portal page and provide a novel and non-obvious method, system and computer program product for context driven arrangement of portlets in a portal page. In an embodiment of the invention, a method of context driven arrangement of portlets in a portal page can be provided. The method can include computing a context for an application co-executing with a portal page in a computing client, and arranging portlets in the portal page in the computing client based upon the computed context.

In aspects of the embodiment, computing a context for an application co-executing with the portal page in the computing client can include identifying an address for content displayed in the application, or content displayed in the application wherein the application is a Web browser. In other aspects of the embodiment, computing a context for an application co-executing with the portal page in the computing client, can include identifying a textual message in the application wherein the application is a chat client.

In yet further aspects of the embodiment, arranging portlets in the portal page in the computing client based upon the computed context can include adding a portlet to the portal page in the computing client based upon the computed context, or removing a portlet from the portal page in the computing client based upon the computed context. In even yet further aspects of the embodiment, arranging portlets in the portal page in the computing client based upon the computed context can include visually emphasizing a portlet in the portal page in the computing client based upon the computed context.

In another embodiment of the invention, a portal page data processing system can be configured for context driven arrangement of portlets. The system can include a computing client hosting each of a portal page and an application and a context driven portal arrangement module coupled to the portal page. The module can include program code enabled to compute a context for the application, and to arrange portlets in the portal page based upon the computed context. In aspects of the embodiment, the application can include a Web browser or a chat client. In other aspects of the embodiment, the context can include an address for content in the Web browser, content in the Web browser or a message in the chat client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for context driven arrangement of portlets in a portal page. In accordance with an embodiment of the present invention, multiple different portlets can be aggregated into a portal page for viewing by an end user in a computer. Subsequently, a context can be computed for the end user with respect to an end user activity in a computing application executing in the computer, such as the content of a chat session or an e-mail exchange or a viewed Web page. Consequently, the portlets in the portal page can be arranged in accordance with the computed context. In this regard, one or more portlets can be visually emphasized that correspond to the computed context, individual ones of the portlets can be removed from the portal page that do not correspond to the computed context, additional portlets can be added to the portal page that correspond to the computed context, or any combination thereof.

Figure 1:
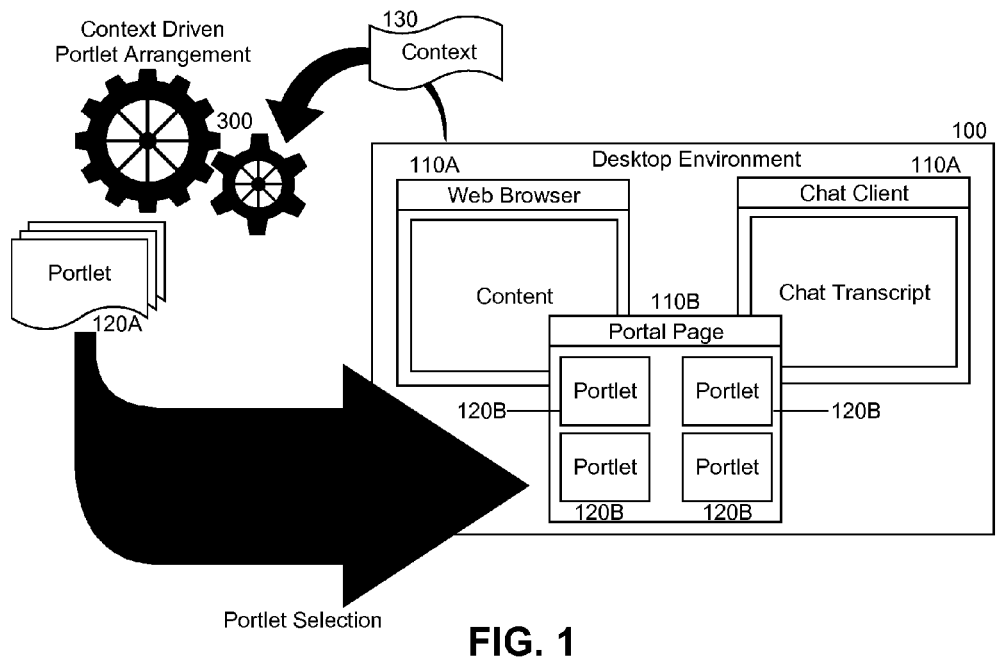
FIG. 1 is a pictorial illustration of process for context driven arrangement of portlets in a portal page.

In further illustration, FIG. 1 is a pictorial illustration of process for context driven arrangement of portlets in a portal page. As shown in FIG. 1, a desktop environment 100 can include a view to multiple different applications 110A, 110B, for instance a Web browser or chat client. The multiple different applications 110A, 110B further can include a portal page 110B of an arrangement of different portlets 120B. As it will be recognized by the skilled artisan, the portal page 110B can be rendered in a Web browser, or other supporting client.

Context driven portal arrangement module 300 can compute a context 130 for one or more of the applications 110A. The context 130 can include a state of one or more of the applications 110A, content rendered within one or more of the applications 110, or input provided to one or more of the applications 110. By way of example, the context 130 can be computed based upon an address provided to a Web browser application, the text of a Web page rendered within a Web browser application, or the text of a message sent or received in a chat client, to name only a few examples.

Context driven portal arrangement module 300 in turn can process the context 130 in order to select one or more portlets 120B for arrangement in the portal page 110B. For instance, the context driven portal arrangement module 300 can select specific ones of the portlets 120B for display in the portal page 110B, specific ones of the portlets 120B to remove from display in the portal page 110B, or specific ones of the portlets 120B in the portal page 110B to be visually emphasized. In respect to the latter instance, the context driven portal arrangement module 300 can enlarge a view to specific ones of the portlets 120B in the portal page 110B, to prominently position specific ones of the portlets 120B in the portal page 110B, or to change a visual appearance of specific ones of the portlets 120B in the portal page 110B.

Figure 2:
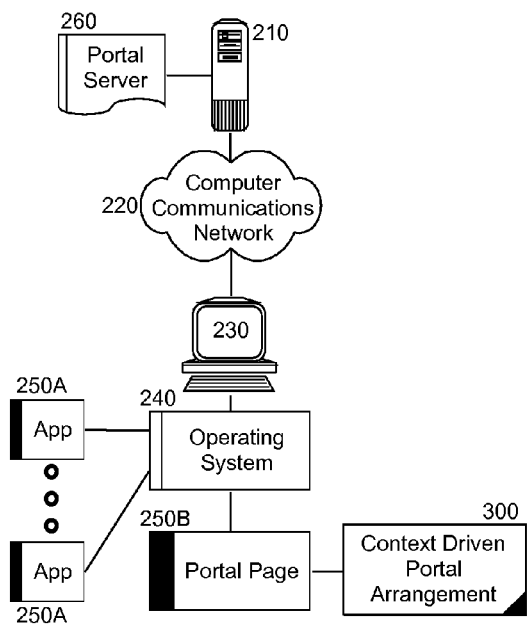
FIG. 2 is a schematic illustration of a portal page data processing system configured for context driven arrangement of portlets; and, FIG. 3 is a flow chart illustrating a process for context driven arrangement of portlets in a portal page.

The process described in connection with FIG. 1 can be implemented within a portal page data processing system. In yet further illustration, FIG. 2 is a schematic illustration of a portal page data processing system configured for context driven arrangement of portlets. The system can include a computing client 230 configured for coupling to a host 210 over computer communications network 220. The computing client 230 can include an operating system 240 supporting the execution of different applications 250A including a portal page 250B.

The portal page 250B can include an arrangement of portlets provided by portal server 260. In this regard, though shown as only a single entity, it should be recognized by the skilled artisan that portal server 260 in host 210 can be representative of multiple different hosts providing multiple different portal servers serving multiple different portlets to portal page 250B. Of note, context driven portal arrangement module 300 can be coupled to portal page 250B either remotely over the computer communications network 220, or directly from within computing client 230 as shown in FIG. 2.

The context driven portal arrangement module 300 can include program code enabled to compute a context for one or more of the applications 250A executing in operating system 240. The context can be computed, for instance, based upon an address provided to a Web browser application, the text of a Web page rendered within a Web browser application, or the text of a message sent or received in a chat client, to name only a few examples.

The program code of the context driven portal arrangement module 300 further can be enabled to map the computed context to a specific arrangement of portlets in the portal page 250B. Specifically, the program code of the context driven portal arrangement module 300 can be enabled to select particular portlets for inclusion in the portal page 250B responsive to the computation of the context, to select particular portlets for exclusion from the portal page 250B responsive to the computation of the context, to select particular portlets for visual emphasis in the portal page 250B, or any combination thereof.

Figure 3:
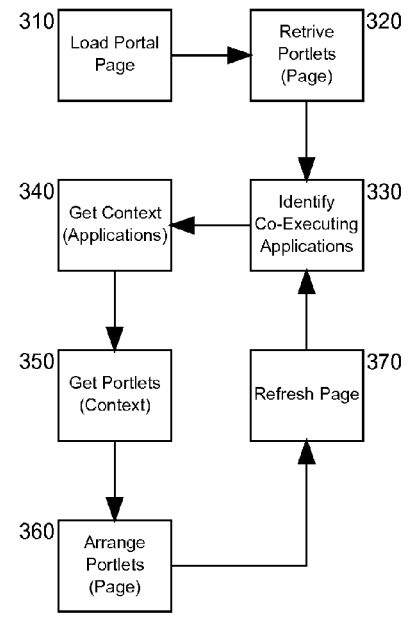

In even yet further illustration of the operation of the context driven portal arrangement module 300, FIG. 3 is a flow chart illustrating a process for context driven arrangement of portlets in a portal page. Beginning in block 310, a portal page can be loaded for viewing in a computing client and in block 320, one or more portlets can be retrieved for inclusion in the portal page. In block 330, one or more co-executing applications in the computing client can be identified and in block 340, a context can be computed for the one or more co-executing applications.

In block 350, one or more portlets whether displayed in the portal page or excluded from the portal page can be selected based upon the computed context. For example, the portlets can be selected by way of a mapping or table relating to the computed context. Thereafter, in block 360 the selected portlets can be arranged in the portal page, through the inclusion, exclusion, or visual emphasis of the selected portlets in the portal page depending upon the computed context. Finally, in block 370 the portal page can be refreshed to reflect the arrangement of the portlets.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method of context driven arrangement of portlets in a portal page, the method comprising:
   displaying a portal page including portlets for a user in a computer;
   identifying a context based on an activity of the user in an application co-executing with the portal page in the computer; and,
   rearranging portlets in the portal page in the computer based upon the identified context.

2. The method of claim 1, wherein the context includes an address for content displayed in the application wherein the application is a Web browser.

3. The method of claim 1, wherein the context includes content displayed in the application wherein the application is a Web browser.

4. The method of claim 1, wherein the context includes a textual message in the application wherein the application is a chat client.

5. The method of claim 1, wherein portlets in the portal page are rearranged by adding a portlet to the portal page.

6. The method of claim 1, wherein portlets in the portal page are rearranged by removing a portlet from the portal page.

7. The method of claim 1, wherein portlets in the portal page are rearranged by visually emphasizing a portlet in the portal page.

8. A portal page data processing system configured for context driven arrangement of portlets, the system comprising:
   a hardware processor configured for
      displaying a portal page including portlets for a user in a computer;
      identifying a context based on an activity of the user in an application co-executing with the portal page in the computer; and,
      rearranging portlets in the portal page in the computer based upon the identified context.

9. The system of claim 8, wherein the application comprises a Web browser.

10. The system of claim 8, wherein the application comprises a chat client.

11. The system of claim 9, wherein the context comprises an address for content in the Web browser.

12. The system of claim 9, wherein the context comprises content in the Web browser.

13. The system of claim 10, wherein the context comprises a message in the chat client.

14. A computer program product comprising a non-transitory computer usable storage medium stored thereon computer usable program code for context driven arrangement of portlets in a portal page, the computer usable program code, when executed by a machine, causes the machine to perform:
   displaying a portal page including portlets for a user in a computer;
   identifying a context based on an activity of the user in an application co-executing with the portal page in the computer; and,
   rearranging portlets in the portal page in the computer based upon the identified context.

15. The computer program product of claim 14, wherein the context includes an address for content displayed in the application wherein the application is a Web browser.

16. The computer program product of claim 14, wherein the context includes content displayed in the application wherein the application is a Web browser.

17. The computer program product of claim 14, wherein the context includes a textual message in the application wherein the application is a chat client.

18. The computer program product of claim 14, wherein the portlets are rearranged by adding a portlet to the portal page.

19. The computer program product of claim 14, wherein the portlets are rearranged by removing a portlet from the portal page.

20. The computer program product of claim 14, wherein the portlets are rearranged by visually emphasizing a portlet in the portal page.

* * * * *